March 1, 1932.   G. DALÉN   1,847,930
COOKING STOVE WITH HEAT ACCUMULATOR
Filed Sept. 18, 1929
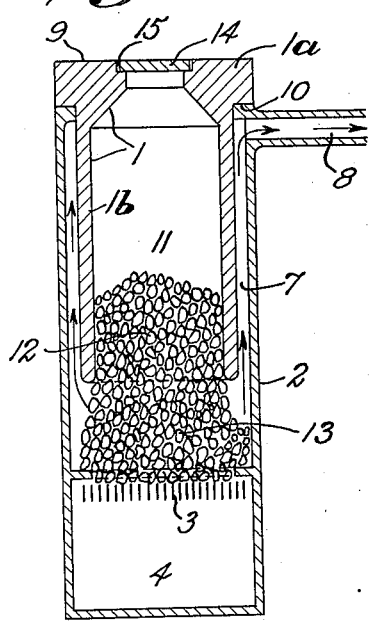
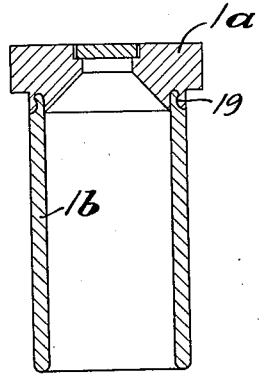
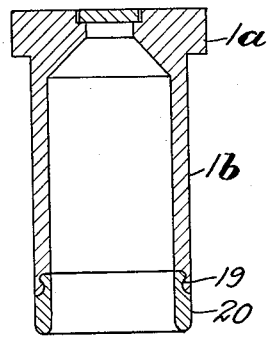
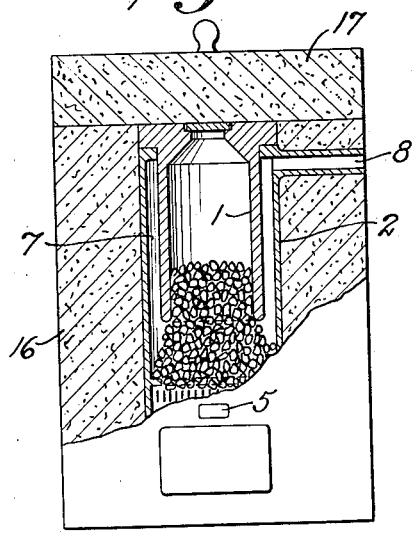
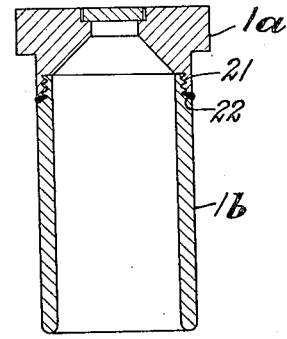
INVENTOR
Gustaf Dalén
BY
Wm J Hedlund
his ATTORNEY Patented Mar. 1, 1932

1,847,930

UNITED STATES PATENT OFFICE

GUSTAF DALÉN, OF LIDINGO, SWEDEN, ASSIGNOR TO SVENSKA AKTIEBOLAGET GASAC-CUMULATOR, OF STOCKHOLM-LIDINGO, SWEDEN

COOKING STOVE WITH HEAT ACCUMULATOR

Application filed September 18, 1929, Serial No. 393,511, and in Sweden October 11, 1929.

The present invention relates to cook stoves provided with a heat accumulator in the form of a metal block of comparatively large dimensions. This type of stove is disclosed in my U. S. Patent No. 1,559,162, granted October 27, 1925. The present invention constitutes an improvement on the subject matter of my aforesaid patent, and the principal feature of the present invention resides in the provision of what may be termed a skirt or skirt portion freely suspended from the cooking or hot plate and providing a fuel magazine, which skirt and hot plate are in good heat conducting relation with each other and which together form the heat accumulator.

The object and advantages of the present invention will appear more fully from the following description taken in conjunction with the accompanying drawings, forming a part of the specification, of which:

Fig. 1 is a sectional elevational view of a preferred form of structure embodying the invention;

Fig. 2 is a sectional elevation of a modified form of heat accumulating element;

Fig. 3 is a similar view of a still further form of heat accumulating element;

Fig. 4 is a similar view of still another form of heat accumulating element; and Fig. 5 illustrates the application of the structure of Fig. 1 to a stove of the type shown in my aforesaid patent.

Referring to Fig. 1, the metal block heat accumulator is designated generally by the reference character 1 and comprises two portions of which the upper portion 1a constitutes the cooking plate or hot plate, and the lower portion 1b is a freely depending heat accumulator skirt. In this embodiment of the invention the hot plate 1a and the skirt 1b are made in one piece in order to obtain good metallic heat conduction. The hot plate 1a is, as shown, a heavy mass of metal, and the top surface 9 thereof is plane and forms the surface on which a cooking pan rests to be heated. The depending skirt portion 1b is of smaller external diameter than the external diameter of the hot plate portion, providing a laterally extending surface or shoulder 10. The heat accumulating element extends downwardly within a cylindrical or tubular combustion housing 2, the upper horizontal surface of which forms a seat on which the shoulder 10 rests. It will be understood that the hot plate or head 1a and the skirt 1b are annular.

The skirt portion 1b provides a fuel storer or magazine space 11 for the storage of solid fuel represented at 12. A cover 14 is provided which closes an opening 15 in the hot plate 1a, and the fuel is supplied through the opening 15 after the cover 14 has been removed. The fuel 12 is supported on any suitable grate of a form adapted to be used with solid fuel and indicated diagrammatically at 3. The housing 2 receives and supports the fuel below the skirt 1b by means of the grate 3 and the side wall of the member 2. The lower part of the member 2 forms a combustion space or fire-place 13 with the grate 3 and an ash pit 4, into which a channel 5 for the supply of combustion air opens.

The skirt 1b, as is clearly shown, terminates short of the grate and is spaced from the side wall structure of the combustion housing. Thus the lower portion of the skirt can have free expansion vertically and laterally independent of the housing 2. The spacing of the skirt from the housing 2 provides an annular channel or gas-pass 7 between the member 2 and the accumulator block for receiving products of combustion from the combustion space 13. The gases generated in the combustion space pass upwardly through the gas-pass 7 adjacent to the accumulator member 1, from which gas-pass the gases escape at 8. Some heat is also given up to the member 2 which is transmitted to the hot plate 1a. As shown in the drawings, the hot plate tapers downwardly to the heat accumulating and magazine skirt 1b.

As shown in Fig. 5, the whole structure may be protected against loss of heat by means of insulation 16 of any suitable heat insulating material, and a removable cap or cover 17 may be provided at the top.

In order to avoid deterioration of the heat accumulating element due to the effect of intense heat from the fire, this element may be made wholly or in part of material adapted to withstand high temperatures. As examples of such material, chromium-nickel-steel, ferro-chromium, white pig iron, etc., may be mentioned.

According to the embodiment in Figure 2 the cooking plate 1a and the storer 1b are made in separate parts. In this arrangement the storer 1b is made of fire resisting material, and the cooking plate 1a, which is made of pig iron, is connected with the storer by means of a casting operation, by placing a mould for the cooking plate 1a at the top of the storer 1b and then casting the metal. For the purpose of obtaining a firm attachment of the parts 1a and 1b, the storer 1b is provided at the top with attaching parts 19 of suitable shape, for instance in the form of hooks, flanges, screw spirals or the like. The two parts 1a and 1b may also be connected to one another by means of a suitable screw connection by shrinking, welding or the like. As fire resisting material usually is difficult to work up, the cooking plate 1a may be made of a softer material so as to be worked up without difficulty for obtaining the desired plane upper surface.

According to the embodiment in Figure 3, only part of the storer 1b is made of fire resisting material namely the lower part 20, which is most exposed to the fire. The cooking plate 1a and the upper part of the storer 1b are cast in one piece, for instance of common pig iron. The two parts of the storer or skirt are connected in a similar manner as is described with reference to Figure 2.

Fig. 4 shows the above-mentioned screw connection together with welding, the screw connection between the skirt and the hot plate being indicated at 21 and the welding being indicated at 22.

From the above it will be evident that the present invention includes the advantages of the stove disclosed in my aforesaid Patent No. 1,559,162, in that there is an accumulation of heat in a heavy metal member which transmits heat from the combustion gases to the hot plate. Besides this, the present invention provides free expansion of the heat accumulating element and permits relative expansion of the heat transmitting element and the housing without affecting the hot plate cooking surface.

It will be seen, with respect to the form of stove shown in my aforesaid patent that, in accordance with the present invention, the heat accumulator is inside the member which cooperates with the grate to form the fire-place, and that the heat accumulator is freely suspended and serves as the magazine for the coal or other solid fuel fed to the fire-place.

It will be understood that I am not to be limited to specific structure except as called for by the appended claims considered in the light of the prior art.

Having now described my invention, what I claim as new and desire to secure by Letters Patent is:—

1. A cook stove comprising a combustion housing, a grate in said housing, and a heat accumulator member mounted on said housing comprising a heavy hot plate portion providing a relatively large reservoir for heat adjacent to the surface of the hot plate and a skirt freely depending from said portion and extending within said housing and terminating short of said grate, said skirt constituting a combined fuel magazine and heat conductor for transmitting heat from adjacent said grate to said hot plate portion.

2. A cook stove comprising a combustion housing, a grate in said housing, and a heat accumulator member mounted on said housing comprising a heavy metal hot plate portion providing a relatively large reservoir for heat adjacent to the surface of the hot plate and a metal skirt integral with and freely depending from said portion, said skirt extending within said housing and terminating short of said grate and constituting a combined fuel magazine and heat conductor for transmitting heat from adjacent said grate to said hot plate portion.

3. A cook stove comprising a combustion housing, a grate in said housing, and a heat accumulator member mounted on said housing comprising a heavy hot plate portion providing a relatively large reservoir for heat adjacent to the surface of the hot plate and a thick skirt freely depending from said portion and extending within said housing and terminating short of said grate, said skirt constituting a combined fuel magazine and heat conductor for transmitting heat from adjacent said grate to said hot plate portion.

4. A cook stove comprising a combustion housing, a grate in said housing, a heavy metal hot plate mounted on said housing, and a combined fuel magazine and heat accumulator skirt freely depending from said hot plate and extending within said housing and terminating short of said grate.

5. A cook stove comprising a combustion housing, a grate in said housing, a thick hot plate mounted on said housing, and a combined fuel magazine and thick heat accumulator skirt freely depending from said hot plate and extending within said housing and terminating short of said grate.

6. A cook stove comprising a combustion housing, a grate in said housing, a thick metal hot plate mounted on said housing, and a combined fuel magazine and heat accumulator skirt integral with and freely depending from said hot plate and extending within said housing and terminating short of said grate.

7. A cook stove comprising a combustion housing, a grate in said housing, a thick hot plate mounted on said housing, a combined fuel magazine and heat accumulator skirt freely depending from said hot plate and extending within said housing and terminating short of said grate and spaced from the side wall structure of the housing, the lower portion of said skirt having free expansion vertically and laterally independently of the housing, means to supply fuel into the interior of said skirt, said housing and skirt providing a gas-pass for products of combustion therebetween, an outlet for products of combustion connected to the upper part of said gas-pass, and means to supply air below said grate.

8. A cook stove comprising a combustion housing, a grate in said housing, a heavy metal hot plate mounted on said housing, a combined fuel magazine and heat accumulator skirt freely depending from said hot plate and extending within said housing and terminating short of said grate and spaced from the side wall structure of the housing, the lower portion of said skirt having free expansion vertically and laterally independently of the housing, means to supply fuel into the interior of said skirt, said housing and skirt providing a gas-pass for products of combustion therebetween, an outlet for products of combustion connected to the upper part of said gas-pass, and means to supply air below said grate.

9. A cook stove comprising a combustion housing, a grate in said housing, a thick hot plate mounted on said housing, a combined fuel magazine and thick heat accumulator skirt freely depending from said hot plate and extending within said housing and terminating short of said grate and spaced from the side wall structure of the housing, the lower portion of said skirt having free expansion vertically and laterally independently of the housing, means to supply fuel into the interior of said skirt, said housing and skirt providing a gas-pass for products of combustion therebetween, an outlet for products of combustion connected to the upper part of said gas-pass, and means to supply air below said grate.

10. A cook stove comprising a combustion housing, a grate in said housing, a thick hot plate mounted on said housing, a combined fuel magazine and heat accumulator skirt integral with and freely depending from said hot plate and extending within said housing and terminating short of said grate and spaced from the side wall structure of the housing, the lower portion of said skirt having free expansion vertically and laterally independently of the housing, means to supply fuel into the interior of said skirt, said housing and skirt providing a gas-pass for products of combustion therebetween, an outlet for products of combustion connected to the upper part of said gas-pass, and means to supply air below said grate.

11. A cook stove comprising a combustion housing having an upper opening, a grate in said housing, a thick metal hot plate mounted on said housing in said opening, a combined fuel magazine and heat accumulator skirt of thick walled cylindrical form freely depending from said hot plate and extending within said housing and terminating short of said grate and spaced from the side wall structure of the housing, the lower portion of said skirt having free expansion vertically and laterally independently of the housing, said hot plate having a fuel supply opening for supplying fuel into the interior of said skirt, a closure for said fuel supply opening, said housing and skirt providing an annular gas-pass for products of combustion therebetween, an outlet for products of combustion connected to the upper part of said gas-pass, and means to supply air below said grate.

12. A cook stove comprising a combustion housing having an upper opening, a grate in said housing, and a heat accumulator member mounted on said housing comprising a heavy metal hot plate portion providing a relatively large reservoir for heat adjacent to the surface of the hot plate and a skirt freely depending from said portion and extending within said housing and terminating short of said grate, said skirt constituting a combined fuel magazine and heat conductor for transmitting heat from adjacent said grate to said hot plate portion and said hot plate portion being generally tapered to facilitate uniform distribution of heat received from said skirt to the hot plate surface.

13. As a new article of manufacture for cook stoves, a metal heat accumulating element comprising a thick head adapted to provide a relatively large reservoir for heat, one side of said head being plane and constituting a cooking plate surface, and a heat transmitting portion projecting from the opposite side of said head, said heat transmitting portion being adapted to absorb heat and to conduct it to said head, the material and cross-sectional area of the heat transmitting portion providing a path of heat transmission of sufficient capacity to conduct heat to said head upon lowering of the temperature of the head due to cooking at a rate sufficient to maintain said surface at cooking temperature, said head being larger laterally than said heat transmitting portion to provide a surface for supporting said element from the head and to permit free longitudinal and lateral expansion of said heat transmitting portion.

14. As a new article of manufacture for cook stoves, a metal heat accumulating element comprising a thick annular head adapted to provide a relatively large reservoir for heat, one side of said head being plane and constituting a cooking plate surface, and an annular skirt of substantially smaller external diameter than the external diameter of said head projecting from the opposite side of said head, said skirt being adapted to absorb heat and to conduct it to said head, the material and cross-sectional area of said skirt providing a path of heat transmission of sufficient capacity to conduct heat to said head upon lowering of the temperature of the head due to cooking at a rate sufficient to maintain said surface at cooking temperature, the difference in external diameters of said head and said skirt providing laterally extending surface for supporting the element adjacent the head whereby to permit free expansion and contraction of the skirt.

15. As a new article of manufacture for cook stoves, a metal heat accumulating element comprising a thick annular head adapted to provide a relatively large reservoir for heat, one side of said head being plane and constituting a cooking plate surface, and a thick annular skirt integral with and projecting from the opposite side of said head, said skirt having an external diameter substantially less than the external diameter of said head and being adapted to absorb heat and to conduct it to said head, the difference in external diameters of said head and said skirt providing laterally extending surface for supporting the element adjacent the head whereby to permit free expansion and contraction of the skirt.

16. As a new article of manufacture, a metal heat accumulating element for cook stoves comprising a thick annular head adapted to provide a relatively large reservoir for heat, one side of said head being plane and constituting a cooking plate surface, and an annular skirt projecting from the opposite side of said head, said skirt being adapted to absorb heat and to conduct it to said head and the wall of said head increasing in lateral thickness from the skirt side of the head to the side thereof constituting said surface so as to facilitate uniform distribution to said surface of heat absorbed from said skirt.

17. As a new article of manufacture, a heat accumulating element for cook stoves comprising a thick annular head adapted to provide a relatively large reservoir for heat, one side of said head being plane and constituting a cooking plate surface, said head decreasing in cross-sectional area away from said surface and merging with an annular skirt projecting from the head and having a wall thickness materially less than the wall thickness of the head, said skirt being adapted to absorb heat and to conduct it to said head.

In testimony whereof I have signed my name to this specification.

GUSTAF DALÉN.

CERTIFICATE OF CORRECTION.

Patent No. 1,847,930. March 1, 1932.

GUSTAF DALÉN.

It is hereby certified that error appears in the printed specification of the above numbered patent requiring correction as follows: Page 1, in the heading to printed specification, date of filing application in Sweden, for "October 11, 1929" read "October 11, 1928"; and that the said Letters Patent should be read with this correction therein that the same may conform to the record of the case in the Patent Office.

Signed and sealed this 9th day of May, A. D. 1933.

M. J. Moore.

(Seal)

Acting Commissioner of Patents.